United States Patent
Hofmann et al.

(10) Patent No.: US 8,220,112 B2
(45) Date of Patent: Jul. 17, 2012

(54) STRAP ANCHORING DEVICE

(75) Inventors: Volker Hofmann, Frankfurt (DE); Matthias Volkmann, Kronberg (DE); Robert Negele, Altenstadt (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 442 days.

(21) Appl. No.: 12/507,213

(22) Filed: Jul. 22, 2009

(65) Prior Publication Data

US 2010/0107371 A1 May 6, 2010

(30) Foreign Application Priority Data

Nov. 5, 2008 (EP) .................................... 08019321

(51) Int. Cl.
*A44B 99/00* (2010.01)
*B60R 21/16* (2006.01)

(52) U.S. Cl. .................. 24/265 R; 280/743.2

(58) Field of Classification Search .................. None
See application file for complete search history.

(56) References Cited

U.S. PATENT DOCUMENTS

| | | | |
|---|---|---|---|
| 1,256,238 A * | 2/1918 | Kumlin | .................. 24/265 A |
| 4,449,275 A | 5/1984 | Nava | |
| 5,060,581 A | 10/1991 | Malinski | |
| 5,103,537 A | 4/1992 | Snyder et al. | |
| 5,445,585 A | 8/1995 | Meeker | |
| 5,588,672 A | 12/1996 | Karlow et al. | |
| 5,829,170 A | 11/1998 | Lutz, Jr. | |
| 2008/0100049 A1 | 5/2008 | Webber | |

FOREIGN PATENT DOCUMENTS

| | | |
|---|---|---|
| DE | 20101118 U1 | 8/2001 |
| DE | 102007008329 A1 | 9/2008 |
| EP | 0978421 A1 | 2/2000 |
| EP | 1322502 B1 | 6/2005 |
| EP | 1279567 B1 | 8/2006 |
| GB | 2367535 A | 4/2002 |
| GB | 2367536 A | 4/2002 |
| WO | 92/13469 A | 8/1992 |
| WO | 02/28691 A1 | 4/2002 |
| WO | 2005/030538 A1 | 4/2005 |

* cited by examiner

*Primary Examiner* — Jack W. Lavinder
(74) *Attorney, Agent, or Firm* — Markell Seitzman; Lonnie R. Drayer

(57) ABSTRACT

A device for anchoring a strap to a structural member has a strap and a strap anchoring member fixed to the strap at a first end of the strap. The strap anchoring member has a length and a width, wherein the length is greater than the width. The strap anchoring member is folded to provide only two layers of the strap anchoring member enclosing an end region of the strap adjacent a first end of the strap. A secured portion of the strap anchoring member is proximal the first end of the strap with both layers of the strap anchoring member fixed to the strap providing a three layer structure. An unsecured portion of the strap anchoring member is distal from the first end of the strap. A second end of the strap may be fixed to an airbag used for protecting an occupant of a motor vehicle. The positioning of the airbag when it is inflated can be achieved by having the strap extend through an aperture in a structural member of a motor vehicle with the strap anchoring device located on a side of the structural member distal from the airbag. The aperture has dimensions such that the unsecured portion of the strap anchoring member engages a surface of the structural member and impairs the passage of the strap anchoring device through the aperture toward the airbag.

16 Claims, 5 Drawing Sheets

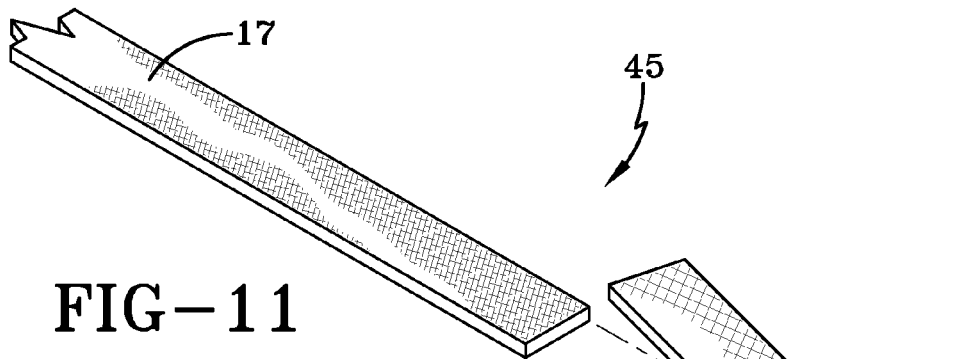
FIG-11
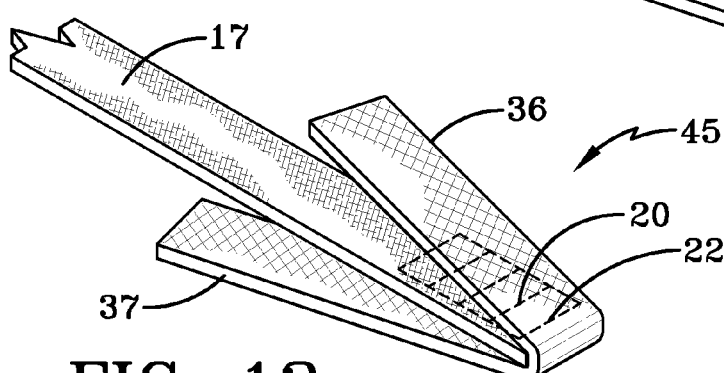
FIG-12
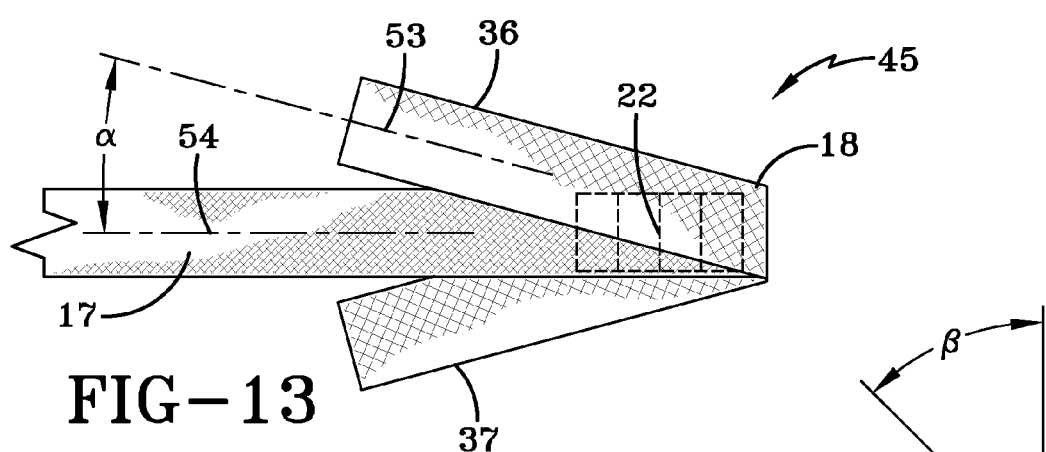
FIG-13
FIG-14

STRAP ANCHORING DEVICE

FIELD OF THE INVENTION

The present invention relates to a strap anchoring device that may be used for securing a tether of an airbag to a structural member of a motor vehicle.

BACKGROUND

So-called curtain airbags are known which are arranged in the roof lining of a vehicle and extend in the case of a crash after their inflation along the sides of the vehicle, so that the persons present in the vehicle are protected from injuries which can arise from the impact of a body part, in particular the head, against the side structure or the side windows of the vehicle. The lower corners of this type of curtain airbag, in particular the corner arranged at the front in the vehicle, are connected to an anchoring member via a strap or cord, usually referred to as a tether, whereby the airbag, the tether and the anchoring member form a unit that functions as a tether anchoring device. The anchoring device locks into a recess in a structural member of the vehicle. By means of a suitable mechanism, it can be ensured that the curtain airbag is sufficiently tensed and for instance an arm or head of a person can be prevented from getting caught between the airbag and the side structure or the side window of the vehicle.

DISCUSSION OF THE PRIOR ART

EP 0 978 421 A1 discloses an airbag of which a part is fastened to a vehicle by screws.

DE 20101118 U1 discloses an airbag system in which a tensioning strap which fixes the airbag in position is fully looped around the wall of the chamber and fastened to the wall and to the vehicle in such a manner that inflating the chamber causes a displacement of the tensioning strap and a tightening of the tether.

U.S. Pat. No. 5,588,672 discloses an airbag which is secured by at least three securing points located inside the vehicle adjacent to the window area.

EP 1 322 502 B1 discloses an end part of a strap folded over twice and then stitched to form an end region that functions as an anchoring device for an airbag.

BRIEF DESCRIPTION OF THE DRAWINGS

FIG. 1 is a perspective view of the components of a first strap anchoring device.

FIG. 2 is a perspective view of the components of a second strap anchoring device.

FIG. 3 is a perspective view of the components of the second strap anchoring device assembled together.

FIG. 4 shows a structural member of an object, such as a motor vehicle, having an aperture therein for receiving a strap anchoring device.

FIG. 5 shows the strap anchoring device being passed through the aperture disclosed in FIG. 4.

FIG. 6 is a side cross section view of the strap anchoring device after it has passed through the aperture disclosed in FIG. 4 wherein the strap anchoring device prevents the strap from being separated from the structural member.

FIG. 7 is a diagrammatic top view a strap anchoring device securing a tether to a structural member of a motor vehicle to restrict the movement of an airbag that is secured to a second end of the tether.

FIG. 8 is a perspective view of the components of a third strap anchoring device.

FIG. 9 is a perspective view of the components of a fourth strap anchoring device.

FIG. 10 is a perspective view of the components of the fourth strap anchoring devices assembled together.

FIG. 11 is a perspective view of the components of a fifth strap anchoring device.

FIG. 12 is a perspective view of the components of the fifth strap anchoring device assembled together.

FIG. 13 is a top view of the components of the fifth strap anchoring device assembled together.

FIG. 14 is a schematic side view representing any of the five illustrated strap anchoring devices showing an end of the strap anchoring device cut at a bevel.

DETAILED DESCRIPTION OF THE INVENTION

FIG. 1 is a perspective view of a strap 10 and a strap anchoring member 12, not yet assembled together, that are the components of a first embodiment of a strap anchoring device 14. The strap anchoring member comprises a sheet having a length and a width, wherein the length is greater than the width.

FIG. 2 is a perspective view of another strap 11 and another strap anchoring member 13, not yet assembled together, that are the components of a second embodiment of a strap anchoring device 15. The only difference between the first and second strap anchoring devices is that the strap anchoring member 13 of the second strap anchoring device 15 has a longitudinally extending slit or slot 16 extending from an end of the strap anchoring member.

FIG. 3 is a side view of the components of the second strap anchoring device 15 with the strap anchoring member 13 fixed to the strap at a first end of the strap with the strap anchoring member folded along the length of the strap anchoring member over an end region of the strap 11. The sheet comprising the strap anchoring member is folded to provide only two layers of the strap anchoring member 13 enclosing an end region of the strap 11 adjacent a first end of the strap. The resulting two layers of the strap anchoring member and the enclosed end region of the strap are then secured together. A secured portion 22 of the strap anchoring member proximal the first end of the strap has both layers of the strap anchoring member fixed to the strap providing a three layer structure, and an unsecured portion 21 of the strap anchoring member distal from the first end of the strap has a U shaped cross section. The slit or slot 16 in the sheet extends only a portion of the length of the sheet and coincides with a line along which the sheet is folded. It is understood that the components of the first strap anchoring device 14 are assembled together in this same manner. In these two embodiments at least the secured portions 22 of the straps 10; 11 and the strap anchoring members 12; 13 that are fixed to one another have longitudinally extending centerlines that extend substantially parallel to one another. Put another way, in these two embodiments the strap 10; 11 has a longitudinally extending centerline and the strap anchoring member 12; 13 has a longitudinally extending centerline, with the longitudinally extending centerlines of the strap 10; 11 and the strap anchoring member being parallel to one another at the secured portion 22 of the strap anchoring member.

In a working example of a device of the type shown in FIGS. 2 and 3 the strap 10; 11 comprised woven polyester. In the working example the strap 10; 11 was 13 mm. wide and 1.6 mm thick. It is understood that the strap may comprise any suitable material. The strap anchoring member 12 in the working example had a width 25 mm and a length of 35 mm. In the working example the strap anchoring member comprised woven polyester, and had a thickness of 1.6 mm. It is understood that the strap anchoring member may comprise any suitable material. In the working example the longitudinally extending slit or slot 16 in the strap anchoring device 15 extended from an end of the strap anchoring member 13 a distance of 16 mm.

Figure 5:
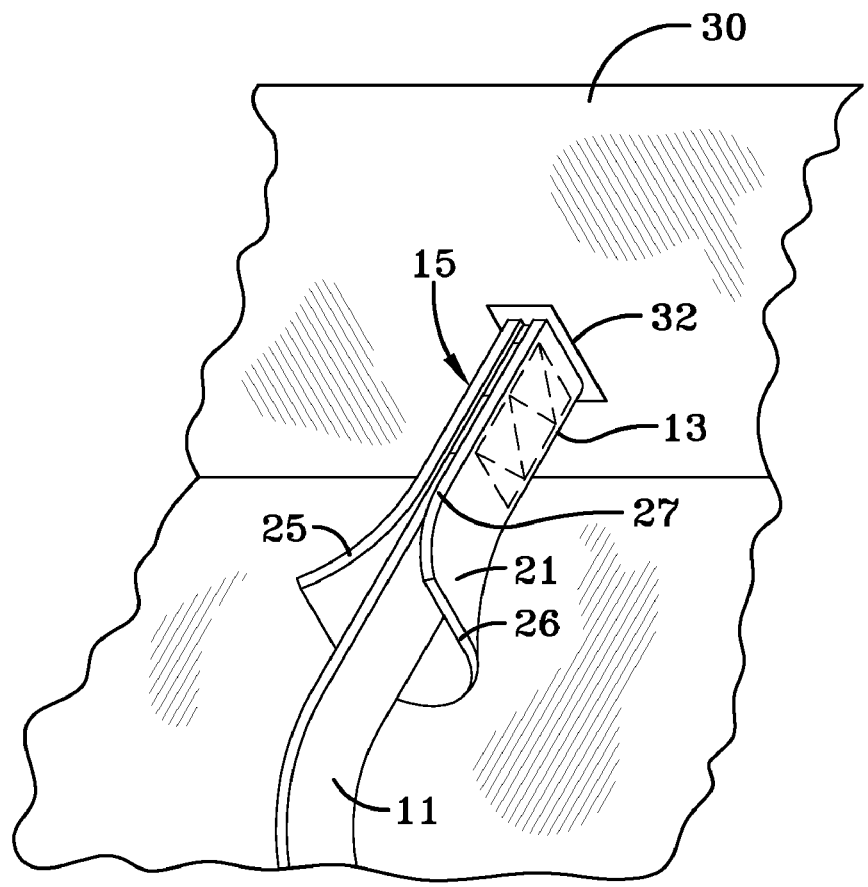

In the working example the two layers of the strap anchoring member and the enclosed end region of the strap are fixed together with stitches 20 that extend along only a portion of the length of the strap anchoring device. In the working example the stitches extend 15 mm along the length of the strap anchoring device leaving an unsecured portion 21 of the strap anchoring member having a length of about 20 mm folded around but not secured to the enclosed portion of the strap. The unsecured portion 21 of the strap anchoring member 13 has free edges 25, 26, 27, which are best shown in FIG. 5. In the working example the thickness of the assembled strap anchoring device was about 4.8 mm.

Figure 1:
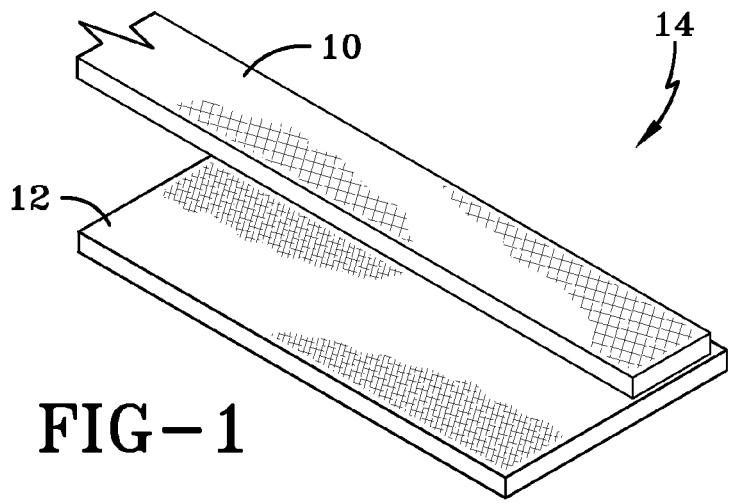
Figure 2:
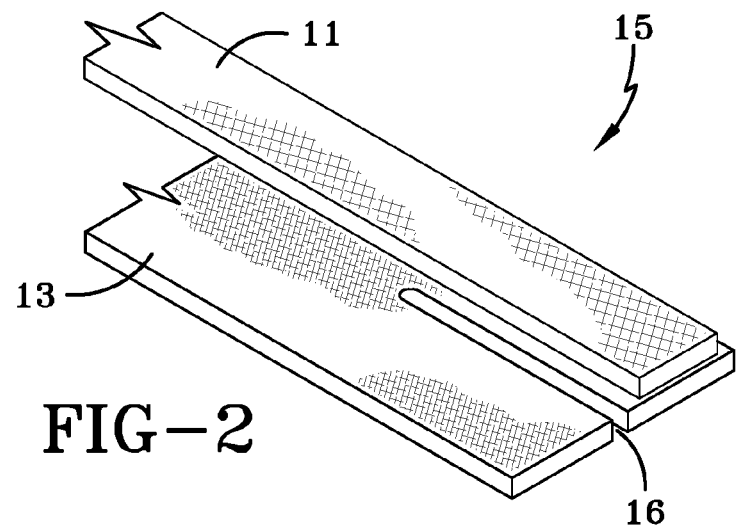
Figure 3:
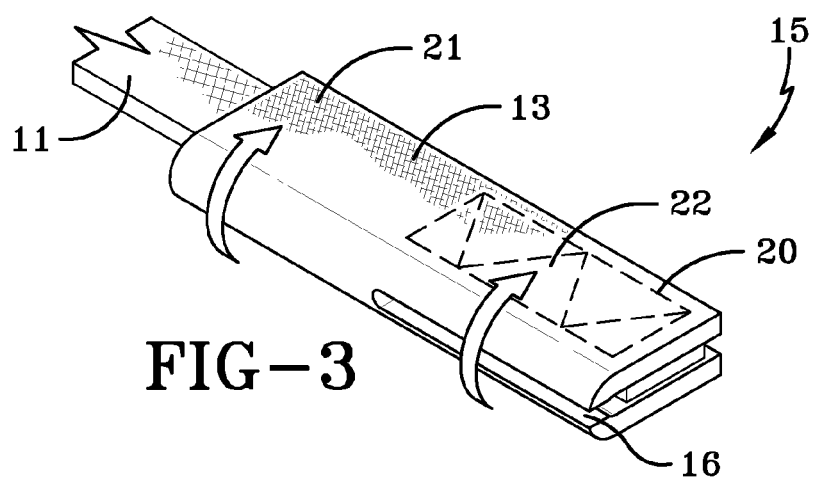
Figure 4:
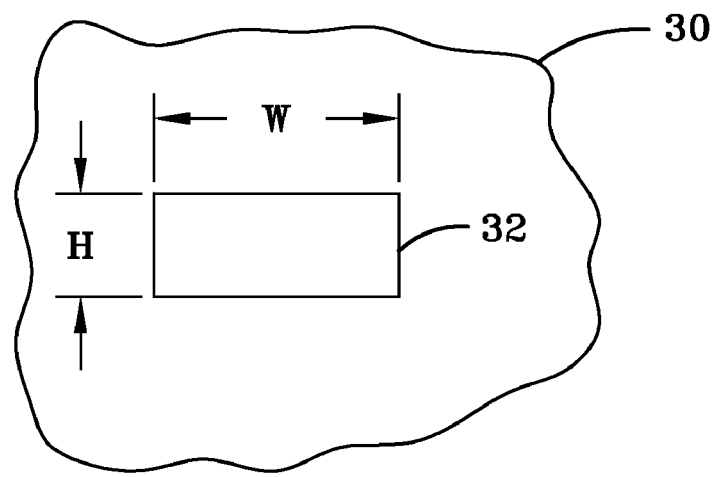

FIG. 4 shows a structural member 30 of an object, such as a structural member of a motor vehicle, having an aperture 32 therein for receiving a strap anchoring device. Examples of structural members of a motor vehicle that may have such an aperture include for example a roof rail, a pillar supporting the roof of a vehicle, and structural members of the instrument panel. In the working example the aperture had a width W of 16 mm and a height H of 5 mm. In the working example the height H of the aperture is only slightly greater than the 4.8 mm thickness of the assembled strap anchoring device, which allows the strap anchoring device 15 to pass through the aperture 32 in the structural member 30 as shown in FIG. 5. by manually pinching the unsecured portion 21 of the strap anchoring member 13 against the strap 11 while the strap anchoring device is passed through the aperture.

Figure 6:
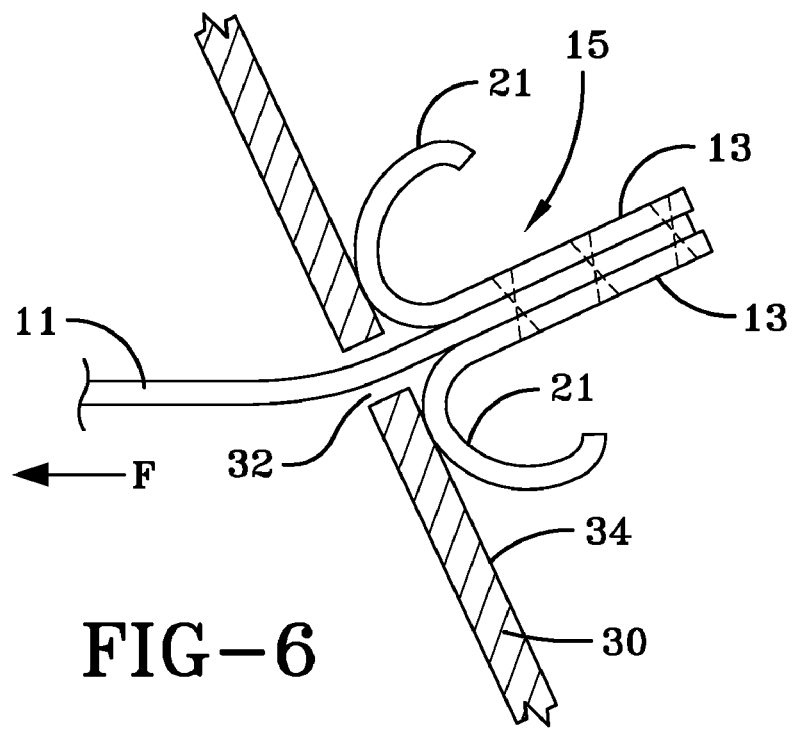

FIG. 6 is a side cross section view of the strap anchoring device 15 after it has passed through the aperture 32 in the structural member 30, wherein the strap anchoring device 15 prevents the strap 11 from being separated from the structural member 30 when a pulling force F is place on the strap 11. After the strap anchoring device has passed through the aperture the unsecured portion 21 of the strap anchoring member 13 is free to move away from the strap 11 to encounter a surface 34 of the structural member with the result that the dimensions of the strap anchoring device are too large to pass back through the aperture when a pulling force F is placed on the strap.

Figure 7:
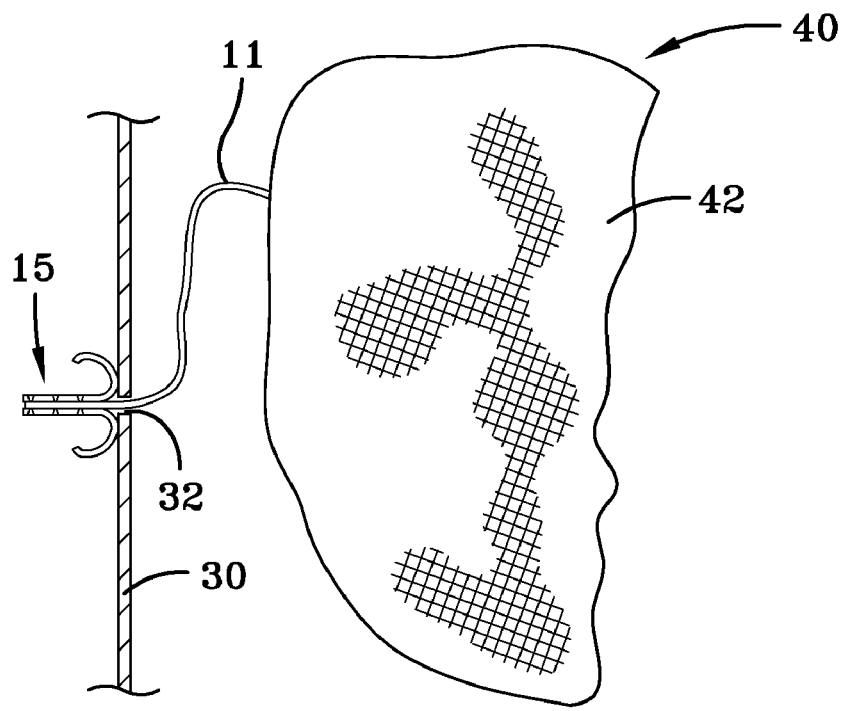

FIG. 7 is a diagrammatic top view of an airbag assembly 40 according to a further embodiment of the invention. The airbag assembly 40 comprises an airbag 42 used for protecting an occupant of a motor vehicle, a strap 11 having one end fixed to the airbag, such that the strap functions as a tether, and a strap anchoring device 15 at the end of the strap that is distal from the airbag. For example the curtain airbag 42 may be stored in the roof lining of a motor vehicle along a side of the passenger compartment. As shown in FIG. 6 the strap anchoring device 15 locks into a suitable component 30 of the motor vehicle. The component 30 may for example be any structural member of a vehicle such as a side pillar, such as the so called "A pillar" or "C pillar", or a roof rail, or a structural member of an instrument panel. For example, in the event of a crash, the airbag 42 is deployed and emerges from the roof lining of the vehicle to act as a side curtain. By means of a suitable tensioning device, here the strap 11 the side curtain airbag 40 can be securely held along the side of the vehicle between a vehicle occupant and the side structure or the side windows of the vehicle. It is understood the strap anchoring device disclosed herein may be used to secure a tether of any other type of an airbag in a vehicle, including but not limited to frontal airbags or knee airbags that deploy from the instrument panel of a vehicle. In each of these applications of the invention the strap extends through an aperture in a structural member of a motor vehicle with the strap anchoring device located on a side of the structural member distal from the airbag to which the second end of the strap is secured, the aperture having dimensions such that the unsecured portion of the strap anchoring member engages a surface of the structural member and impairs the passage of the strap anchoring device through the aperture towards the airbag.

Figure 8:
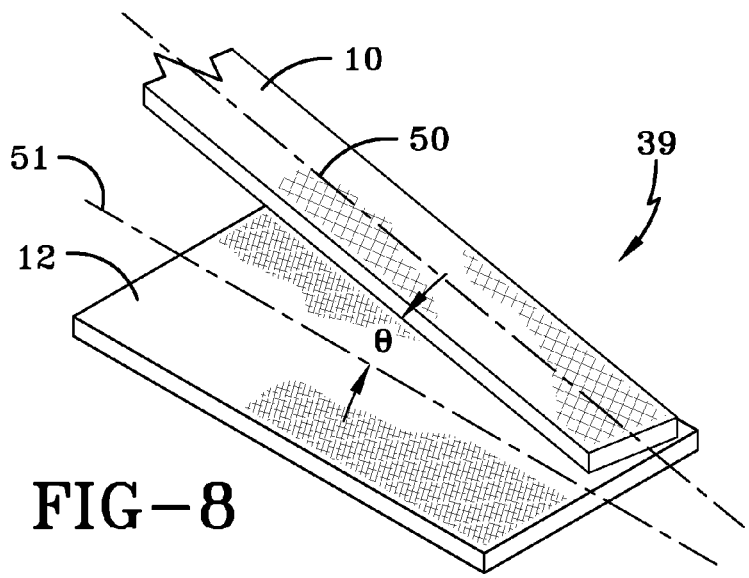
Figure 9:
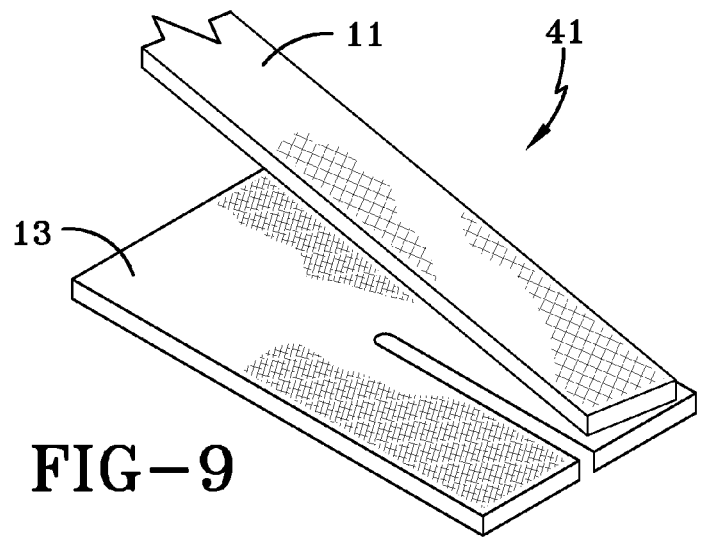
Figure 10:
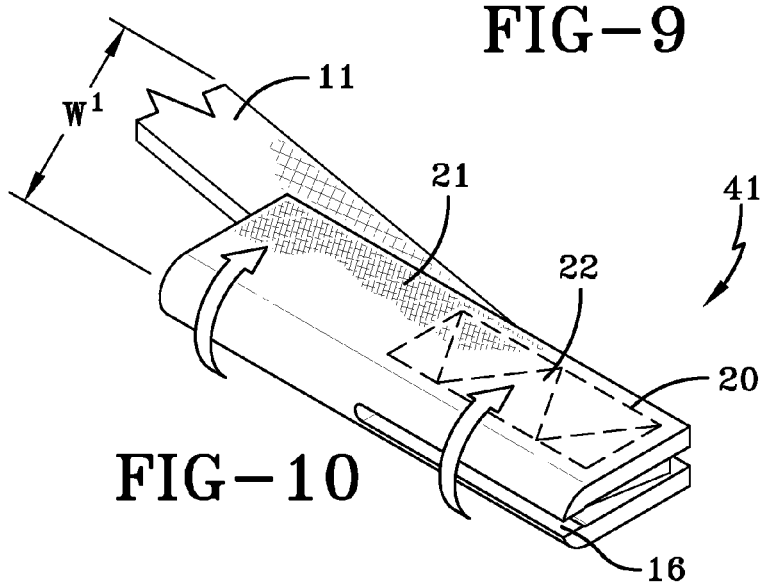

FIGS. 8-10 disclose additional strap anchoring devices that are similar to those already shown and described. FIG. 8 is a perspective view of the components 10, 12 of a third strap anchoring device 39. FIG. 9 is a perspective view of the components 11, 13 of a fourth strap anchoring device 41. FIG. 10 is a perspective view of the components of the fourth strap anchoring device assembled together. The straps 10; 11 and the strap anchoring members 12; 13 of these embodiments are like those already described with respect to the first and second embodiments. However, in these two embodiments at least the portions of the straps 10; 11 and the strap anchoring members 12; 13 that are fixed to one another have longitudinally extending centerlines 50, 51 that are oriented at an angle $\theta$ with respect to one another, for example about 10°. The angle $\theta$ is of a size such that the resulting width $W^1$ of the strap anchoring device can pass though the aperture 32 in the structural member 30. Put another way, in these embodiments the strap 10; 11 has a longitudinally extending centerline and the strap anchoring member 12; 13 has a longitudinally extending centerline, with the longitudinally extending centerlines of the strap and the strap anchoring member being offset from one another at an acute angle $\theta$ another at the secured portion 22 of the strap anchoring member. In all other respects the structure and manufacture of the strap anchoring devices of the third and fourth embodiments is the same as described above with respect to the first and second embodiments.

FIGS. 11-13 disclose a fifth strap anchoring device 45 that is similar to the first four embodiments. FIG. 11 is a perspective view of the components of a fifth strap anchoring device; FIG. 12 is a perspective view of the components of the fifth strap anchoring device assembled together; and FIG. 13 is a top view of the components of the fifth strap anchoring device assembled together. The strap 17 is like those already described with respect to the first four embodiments. In this fifth strap anchoring device the strap anchoring member 18 comprises a narrow flat piece of material, having a relatively short length as compared to the strap. The strap anchoring member may comprise a short length of the same material comprising the strap and have essentially the same width and thickness as the strap, or it may comprise any other suitable material. The length of the strap anchoring member is dependent upon the dimensions of the aperture in a structural member through which the strap anchoring device must pass. In this fifth strap anchoring device the strap anchoring member 18 is folded over upon itself one time to form a V, then an end of the strap 17 is placed into the apex of the V between the legs 36, 27 of the V in a configuration that appears like the head of an arrow when viewed from above as in FIG. 13, wherein the V points away from the strap. Like the first four strap anchoring devices the folded strap anchoring member 18 provides only two layers of the strap anchoring member enclosing an end region of the strap adjacent the first end of the strap 17. Also like the first four strap anchoring devices this fifth strap anchoring device 45 has a secured portion 22 of the strap anchoring member 18 proximal the first end of the strap 17 having both layers of the strap anchoring member fixed to the strap providing a three layer structure. Also like the first four strap anchoring devices this fifth strap anchoring device 45 may have the two layers of the strap anchoring member and the enclosed end region of the strap fixed together with stitches 20 that extend along only a portion of the length of the strap anchoring device.

In the fifth strap anchoring device 45 the strap 17 has a longitudinally extending centerline 54. Each of the legs 36, 37 of the strap anchoring member 18 folded into a V configuration has a longitudinally extending centerline 53. The longitudinally extending centerlines 53 of the legs of the strap anchoring member 18 are oriented at an acute angle α with respect to longitudinally extending centerline 54 of the strap, for example about 20°. The angle α is of a size such that the resulting width of the strap anchoring device can pass though the aperture 32 in the structural member 30.

FIG. 14 is a schematic side view representing any of the five illustrated strap anchoring devices 14; 15; 39; 41; 45 showing an end of the strap anchoring device cut at a bevel β. If the strap 10; 11; 17 and the associated strap anchoring member 12; 13; 18 each comprise a material having a relatively low melting temperature, such as a polyester or nylon, the three layer structure at the end of the strap anchoring device can be cut at a bevel β, such as 45°, using a heated cutting tool that melts the remaining edge at the end of the strap anchoring device. The resultant edge of the strap anchoring device will almost immediately cool to yield an edge wherein all three layers are welded together and will not separate or fray when the strap anchoring device is passed through an aperture in a structural member 30.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The invention claimed is:

1. A strap anchoring device comprising a strap and a strap anchoring member fixed to the strap at a first end of the strap, the strap anchoring member having a length and a width, wherein the length is greater than the width, the strap anchoring member being folded to provide only two layers of the strap anchoring member enclosing an end region of the strap adjacent the first end of the strap, a secured portion of the strap anchoring member proximal the first end of the strap having both layers of the strap anchoring member fixed to the strap providing a three layer structure, and an unsecured portion of the strap anchoring member distal from the first end of the strap, wherein the strap anchoring member is folded along the length of the strap anchoring member about the strap such that the strap anchoring member has a U shaped cross section and wherein the strap has a longitudinally extending centerline and the strap anchoring member has a longitudinally extending centerline, with the longitudinally extending centerlines of the strap and the strap anchoring member being parallel to one another at the secured portion of the strap anchoring member.

2. The strap anchoring device of claim 1 wherein the strap anchoring member is folded over upon itself one time to form a V having a pair of legs, and the first end of the strap of the strap is disposed in the apex of the V between the legs of the V providing the three layer structure.

3. The strap anchoring device of claim 1 wherein the strap and the strap anchoring member each comprise a woven fabric.

4. The strap anchoring device of claim 1 wherein the secured portion of the strap anchoring member is fixed to the strap by stitches.

5. The strap anchoring device of claim 1 in combination with an airbag used for protecting an occupant of a motor vehicle wherein a second end of the strap is fixed to an airbag.

6. The strap anchoring device of claim 5 wherein the strap extends through an aperture in a structural member of a motor vehicle with the strap anchoring device located on a side of the structural member distal from the airbag to which the second end of the strap is secured, the aperture having dimensions such that the unsecured portion of the strap anchoring member engages a surface of the structural member and impairs the passage of the strap anchoring device through the aperture towards the airbag.

7. The strap anchoring device of claim 6 wherein the airbag is a side curtain airbag and the structural member is a roof rail of the motor vehicle.

8. A strap anchoring device of claim 6 wherein the airbag is a side curtain airbag and the structural member is a pillar supporting a roof of the motor vehicle.

9. A strap anchoring device of claim 6 wherein the airbag a frontal airbag and the structural member is a structural member of an instrument panel of the motor vehicle.

10. The strap anchoring device of claim 6 wherein the airbag is a knee airbag and the structural member is a structural member of an instrument panel of the motor vehicle.

11. A strap anchoring device comprising a strap and a strap anchoring member fixed to the strap at a first end of the strap, the strap anchoring member having a length and a width, wherein the length is greater than the width, the strap anchoring member being folded to provide only two layers of the strap anchoring member enclosing an end region of the strap adjacent the first end of the strap, a secured portion of the strap anchoring member proximal the first end of the strap having both layers of the strap anchoring member fixed to the strap providing a three layer structure, and an unsecured portion of the strap anchoring member distal from the first end of the strap, wherein the strap anchoring member is folded along the length of the strap anchoring member about the strap such that the strap anchoring member has a U shaped cross section, wherein the strap anchoring member has a slit or slot in the sheet extending only a portion of the length of the strap anchoring member and coinciding with a line along which the strap anchoring member is folded and wherein the strap has a longitudinally extending centerline and the strap anchoring member has a longitudinally extending centerline, with the longitudinally extending centerlines of the strap and the strap anchoring member being parallel to one another at the secured portion of the strap anchoring member.

12. The strap anchoring device of claim 11 wherein the strap has a longitudinally extending centerline and the strap anchoring member has a longitudinally extending centerline, with the longitudinally extending centerlines of the strap and the strap anchoring member being offset from one another at an acute angle another at the secured portion of the strap anchoring member.

13. A strap anchoring device comprising a strap and a strap anchoring member fixed to the strap at a first end of the strap, the strap anchoring member having a length and a width, wherein the length is greater than the width, the strap anchoring member being folded to provide only two layers of the strap anchoring member enclosing an end region of the strap adjacent the first end of the strap, a secured portion of the strap anchoring member proximal the first end of the strap having both layers of the strap anchoring member fixed to the strap providing a three layer structure, and an unsecured portion of the strap anchoring member distal from the first end of the strap, wherein the strap anchoring member is folded along the length of the strap anchoring member about the strap such that the strap anchoring member has a U shaped cross section and wherein the strap has a longitudinally extending centerline and the strap anchoring member has a longitudinally extending centerline, with the longitudinally extending centerlines of the strap and the strap anchoring member being offset from one another at an acute angle another at the secured portion of the strap anchoring member.

14. A strap anchoring device comprising a strap and a strap anchoring member fixed to the strap at a first end of the strap, the strap anchoring member having a length and a width, wherein the length is greater than the width, the strap anchoring member being folded along the length of the strap anchoring member into a U shaped cross section to provide only two layers of the strap anchoring member enclosing an end region of the strap adjacent the first end of the strap, a secured portion of the strap anchoring member proximal the first end of the strap having both layers of the strap anchoring member fixed to the strap providing a three layer structure, and an unsecured portion of the strap anchoring member distal from the first end of the strap, the strap and the strap anchoring member each comprising a woven fabric.

15. The strap anchoring device of claim 14 wherein the strap anchoring member has a slit or slot in the sheet extending only a portion of the length of the strap anchoring member and coinciding with a line along which the strap anchoring member is folded.

16. A strap anchoring device comprising a strap and a strap anchoring member fixed to the strap at a first end of the strap, the strap anchoring member having a length and a width, wherein the length is greater than the width, the strap anchoring member being folded over upon itself one time to form a V having a pair of legs to provide only two layers of the strap anchoring member enclosing an end region of the strap adjacent the first end of the strap, a secured portion of the strap anchoring member proximal the first end of the strap having both layers of the strap anchoring member fixed to the strap providing a three layer structure, and an unsecured portion of the strap anchoring member distal from the first end of the strap and wherein the strap and the strap anchoring member each comprise a woven fabric.

* * * * *